United States Patent [19]

Des Courieres et al.

[11] Patent Number: 5,675,050

[45] Date of Patent: Oct. 7, 1997

[54] CRYSTALLINE MICROPOROUS SOLIDS CONSISTING OF ALUMINOPHOSPHATES SUBSTITUTED BY A METAL AND OPTIONALLY BY SILICON AND BELONGING TO THE FAU STRUCTURE TYPE, THEIR SYNTHESIS AND APPLICATIONS

[75] Inventors: Thierry Des Courieres, Lyon; Joël Patarin, Flaxlanden; Jean Louis Guth; Ligia Sierra, both of Brunstatt, all of France

[73] Assignee: Elf Aquitaine, Courbevoie, France

[21] Appl. No.: 380,610

[22] Filed: Jan. 30, 1995

[30] Foreign Application Priority Data

Jan. 31, 1994 [FR] France ................................... 94 01013

[51] Int. Cl.$^6$ ........................... C01B 39/02; C07C 2/02
[52] U.S. Cl. ........................ 585/533; 95/90; 210/660; 423/700; 423/703; 423/704; 423/718; 585/721
[58] Field of Search ........................ 423/306, 700, 423/703, 704, 718; 585/533, 721; 210/660; 95/90

[56] References Cited

U.S. PATENT DOCUMENTS

| | | | |
|---|---|---|---|
| 4,187,283 | 2/1980 | Kokotailo et al. | 423/700 |
| 4,375,458 | 3/1983 | Dwyer et al. | 423/703 |
| 4,526,879 | 7/1985 | Dwyer et al. | 423/703 |
| 4,758,419 | 7/1988 | Lok et al. | 423/583 |
| 4,853,197 | 8/1989 | Wilson et al. | 423/306 |
| 5,116,590 | 5/1992 | Vaughan et al. | 423/703 |
| 5,240,891 | 8/1993 | Patton et al. | 423/306 |
| 5,370,858 | 12/1994 | Dougnier et al. | 423/704 |
| 5,393,511 | 2/1995 | Delprato et al. | 423/718 |

OTHER PUBLICATIONS

D.E.W. Vaughan, "The Synthesis and Manufacture of Zeolites", *Chemical Engineering Progress* (Feb. 1988 1988), pp. 25–31.

*Primary Examiner*—Wayne Langel
*Attorney, Agent, or Firm*—Burgess, Ryan & Wayne

[57] ABSTRACT

Crystalline microporous solids of the aluminophosphate type consisting of MeAPO-FAU and MeAPSO-FAU with Me denoting a metal which can adopt tetrahedral coordination in an oxide, for example Co and Zn. The solids are synthesized by hydrothermal crystallization of a gel containing the elements Me, Al, P or Me, Al, P and Si and a structuring agent consisting of a mixture of tetrapropylammonium and tetramethylammonium cations. These solids can be employed in adsorption and also as catalysts in the conversion of organic compounds such as hydrocarbons.

37 Claims, No Drawings

CRYSTALLINE MICROPOROUS SOLIDS CONSISTING OF ALUMINOPHOSPHATES SUBSTITUTED BY A METAL AND OPTIONALLY BY SILICON AND BELONGING TO THE FAU STRUCTURE TYPE, THEIR SYNTHESIS AND APPLICATIONS

BACKGROUND OF THE INVENTION

1) Field of the Invention

The invention relates to crystalline microporous solids consisting of aluminophosphates substituted by a metal, especially a divalent metal or by a metal, especially a divalent metal, and silicon, and belonging to the structural type FAU. It also relates to a process for the synthesis of these microporous solids and furthermore relates to their application in adsorption and catalysis.

2) Background Art

In crystalline microporous solids belonging to the class of aluminophosphates the framework is normally neutral ($Al^{III}:P^V$ atomic ratio=1). This framework can be made negative and thereby gives these materials advantageous properties such as adsorption, cation exchange or catalytic activity by replacing $P_V$ or the pair $Al^{III}$, $P_V$ with a tetravalent element such as silicon, the materials obtained being denoted by the acronym SAPO, or by replacing $Al^{III}$ with a metal, especially a divalent metal such as zinc or cobalt, the materials obtained being denoted by the acronym MeAPO where Me is the metal, or else by combining these two types of substitution, the materials obtained being denoted by the acronym MeAPSO.

Until now, only some aluminophosphates substituted solely with silicon and called SAPO-37 have been described as having the FAU structural type (EP-A-0103117).

SUMMARY OF THE INVENTION

The present invention relates to new crystalline microporous solids of FAU structure, which in their framework contain $Al^{III}$, $P_V$ and in addition metals, especially divalent metals (MeAPO-FAU) or metals, especially divalent metals, and silicon (MeAPSO-FAU).

Examples of crystalline microporous solid materials MeAPO and MeAPSO, where Me denotes a metal such as Zn or Co, are given in particular in reference EP-A-0132708 in the case of the MeAPO materials and in references EP-A-0158975 and EP-A-01614489 in the case of the MeAPSO materials. However, these materials have crystalline structures other than the FAU structure.

The structural abbreviations FAU (FAUjasite) and AFR (Aluminophosphate FoRty), which are employed in the present invention are defined in the work by W. M. Meier and D. H. Olson entitled "Atlas of Zeolite Structure Types" (third revised edition, 1992, Butterworth-Heinemann), this work also giving the description of these structures. The FAU structure of the crystalline microporous solids MeAPO and MeAPSO according to the invention also exists in other materials, such as the zeolites of the aluminosilicate type which are described in reference FR-A-2,638,444.

The crystalline microporous solids according to the invention are aluminophosphates substituted in the framework by a metal, especially a divalent metal Me (MeAPO solids) or by a metal, especially a divalent metal Me and silicon (MeAPSO solids). Like the microporous solid materials MeAPO and MeAPSO described in the above-mentioned references, the microporous solids MeAPO-FAU and MeAPSO-FAU according to the invention have a three-dimensional crystalline structure formed by assembling tetrahedral $TO_4$ units with T=Me, Al, P (MeAPO solids) or tetrahedral $TO_4$ units with T=Me, Al, P and Si (MeAPSO solids) and the molar composition of the framework of the said solids, expressed as oxide, can be defined by an empirical formula which is written $(Me_xAl_yP_z)O_2$ in the case of the MeAPO solids and $(Me_xAl_uP_vSi_w)O_2$ in the case of the MeAPSO solids, and in which the symbols x, y, z, u, v and w denote the molar contents of the elements associated with these symbols in the formula of the oxide, with $x+y+z=1$ and $x+u+v+w=1$.

DESCRIPTION OF THE PREFERRED EMBODIMENTS

The crystalline microporous solids according to the invention are characterized in that, in the framework formulae $(Me_xAl_yP_z)O_2$ and $(Me_xAl_uP_vSi_w)O_2$, the symbols x, y, z, u, v and w are such that $0.001 \leq x \leq 0.15$, $0.51 \leq y \leq 0.34$, $0.49 \leq z \leq 0.51$, $0.30 \leq u \leq 0.51$, $0.30 \leq v \leq 0.51$ and $0.001 \leq w \leq 0.20$, and in that they belong to the FAU structural type.

In the abovementioned formulae Me denotes at least one metal chosen from the metals capable of adopting a tetrahedral coordination in an oxide, the said metals being in particular divalent metals such as Zn, Cu, Co, Ni, Mg and Mn.

As indicated above, the crystalline microporous solids according to the invention belong to the FAU structural type, that is to say have a crystal structure corresponding substantially to that of faujasite which, as is well known, has a crystal structure of cubic symmetry.

Like the other MeAPO and MeAPSO materials, the crystalline microporous solids MeAPO-FAU and MeAPSO-FAU are synthesized in the presence of an organic structuring agent. In their crude form from synthesis the said solids contain, occluded in their cavities, the organic structuring agent employed for their synthesis, as well as a certain quantity of water of hydration. The dehydration of the said solids in their crude state from synthesis, by heating to approximately 150° C., does not generally result in the loss of the structuring agent.

The formula of the crystalline microporous solids MeAPO-FAU or MeAPSO-FAU in the crude form from synthesis can therefore be written, in the dehydrated state: $(S)_s:(Me_xAl_yP_z)O_2$ or $(S)_s:(Me_xAl_uP_vSi_w)O_2$, where s is a number between 0.06 and 0.2 and more particularly between 0.08 and 0.15 and denotes the molar quantity of the structuring agent S per mole of the oxide $(Me_xAl_yP_z)O_2$ or $(Me_xAl_uP_vSi_w)O_2$.

Calcination of the crude form from synthesis at a temperature which is sufficient to remove the organic structuring agent produces a calcined crystalline microporous solid which has empty pores or cavities. The calcination temperature is generally higher than 400° C. and preferably between 450° C. and 550° C.

The characterization of the products according to the invention, namely crystalline microporous solids in crude form from synthesis, also called precursors, and the crystalline microporous solids in the calcined state, can be performed by chemical analysis and above all by radiocrystallographic analysis resulting in the X-ray diffraction pattern.

This diffraction pattern is obtained by means of a diffractometer by employing the conventional powder method with copper Kα radiation. An internal standard makes it possible to determine accurately the values of the angles 2θ associated with the diffraction peaks. The various lattice constants $d_{hkl}$, characteristic of the sample, are calculated from the Bragg relationship. The estimation of the error of measurement $\Delta(d_{hkl})$ of $d_{hkl}$ is calculated, as a function of the absolute error $\Delta(2\theta)$, using the Bragg relationship. In the presence of an internal standard this error $\Delta(2\theta)$ is reduced to a minimum and also commonly taken as equal to ±0.05°. The relative intensity I/Io assigned to each value $d_{hkl}$ is estimated from the height of the corresponding diffraction peak.

A scale of symbols is employed to characterize this relative intensity, as follows: VS=very strong, S=strong, mS=moderately strong, m=medium, mw=moderately weak, w=weak, vw=very weak.

The table below shows the characteristic X-ray diffraction pattern of the precursors of the crystalline microporous solids of the MeAPO-FAU and MeAPSO-FAU type.

In the $d_{hkl}$ column the mean values of the lattice constance have been shown in angstroms (Å). Each of these values must be qualified by the measurement error $\Delta(d_{hkl})$ of between ±0.2 and ±0.008. The differences which can be observed in relation to these mean values are essentially linked with the nature and the quantity of elements Me present in the MeAPO-FAU compounds with, additionally, the quantity of the element Si present in the MeAPSO-FAU compounds. These differences reach at most 0.15 Å in the case of $d_{hkl}$ values close to 14 Å and at most 0.03 Å in the case of $d_{hkl}$ values close to 3 Å. The same remarks apply to the relative intensities I/Io.

The X-ray diffraction patterns for the crystalline microporous solids MeAPO-FAU and MeAPSO-FAU which are obtained after calcination are very similar to the above patterns and the remarks relating to the effect of the composition on $d_{hkl}$ and I/Io also apply.

Both the MeAPO-FAU and MeAPSO-FAU precursors and the corresponding calcined solids exhibit X-ray diffraction patterns which correspond substantially to the pattern in the table.

TABLE

Mean values of $d_{hkl}$ and relative intensities measured on an X-ray diffraction pattern obtained with the precursors of the microporous solids MeAPO-FAU and MeAPSO-FAU.

| 2θ (degrees) | $d_{hkl}$ (Å) | I/Io |
|---|---|---|
| 6.17 | 14.3 ± 0.2 | VS |
| 10.10 | 8.75 | m |
| 11.86 | 7.45 ± 0.05 | w |
| 15.61 | 5.67 | S |
| 18.63 | 4.76 | mS |
| 20.30 | 4.37 | m |
| 21.24 | 4.18 | w |
| 22.72 | 3.91 | mw |
| 23.57 | 3.77 | S |
| 24.90 | 3.57 | vw |
| 25.70 | 3.464 | mw |
| 26.96 | 3.305 | mS |
| 27.68 | 3.220 ± 0.008 | vw |
| 29.53 | 3.023 | mw |
| 30.63 | 2.917 | mw |
| 31.28 | 2.857 | m |
| 32.33 | 2.767 | w |
| 32.94 | 2.717 | vw |
| 33.95 | 2.638 | mw |
| 34.55 | 2.594 | w |

A process for the synthesis of the crystalline microporous solids MeAPO-FAU and MeAPSO-FAU according to the invention is of the type consisting in preparing a reaction mixture called a gel and containing water, a source of the element P, a source of the element Al, a source of the element Me for the MeAPO compounds with, additionally, a source of the element Si for the MeAPSO compounds, organic structuring agents and a pH regulator for the gel, the quantities of the said reactants being adjusted to as to give this gel a composition permitting its crystallization as MeAPO or MeAPSO, and in then maintaining the gel obtained at a temperature below 200° C. and at a pressure at least equal to the autogenous pressure of the mixture consisting of the said gel for a period sufficient to produce the crystallization of this gel as a precursor of the microporous solid consisting of this microporous solid entrapping the structuring agent in its cavities and, if appropriate, in subjecting the precursor to a calcination to destroy the structuring agent and to produce the calcined form of the microporous solid, and is characterized in that the structuring agents consist of a mixture of tetrapropylammonium (TPA) cations and of tetramethylammonium (TMA) cations in a TPA:TMA molar ratio of between 3 and 50 and preferably ranging from 8 to 40.

According to the invention the pH of the gel is adjusted to a value of between 6 and 8.5 and preferably ranging from 6.5 to 8. This pH adjustment is advantageously carried out by employing an organic base as pH regulator, and most especially tetrapropylammonium hydroxide (TPAOH) by itself or in combination with tetramethylammonium hydroxide (TMAOH).

The source of TPA cations consists of TPAOH, generally in the form of an aqueous solution, for example containing 40% by weight or 20% by weight, by itself or in combination with a tetrapropylammonium halide (TPAX), for example chloride or bromide (X=Cl⁻ or Br⁻).

The source of TMA cations is either TMAOH, advantageously in the form of the solid TMAOH.5H₂O or of an aqueous solution, for example a solution containing 20% or 25% by weight, or a tetramethylammonium halide (TMAX'), for example chloride or bromide (X'=Cl⁻ or Br⁻) or else a mixture of TMAOH and TMAX'.

The molar composition, referred to $P_2O_5$, and the molar ratios of the reactants in the gel have values which are included more particularly in the ranges given below.

|  | Broad range | Preferred range |
|---|---|---|
| $P_2O_5$ | 1 | 1 |
| $Al_2O_3$ | 0.7–1.3 | 0.8–1.1 |
| MeO | 0.01–0.3 | 0.02–0.15 |
| $SiO_2$ (for MeAPSO-FAU) | 0.01–0.6 | 0.05–0.4 |
| TPAOH | 1.2–2.0 | 1.3–1.6 |
| TPAOH + TPAX (ΣTPA) | 1.4–2.7 | 1.6–2.5 |
| TMAOH | 0–0.3 | 0–0.2 |
| TMAOH + TMAX' (ΣTMA) | 0.03–0.3 | 0.05–0.2 |
| ΣTPA:ΣTMA | 3–50 | 8–40 |
| $H_2O$ | 50–120 | 55–100 |

The procedure for preparing the gel comprises several mixing stages separated by periods of stirring.

The procedure for the preparation of the gel is preferably applied as follows:

1st mixing stage: mixing of the source of the element P with the source of the element Al and water so that the weight ratio of water to the quantity of the two sources (P and Al) is between 0.7 and 1.3;

1st stirring period: duration between 1 h and 30 h and preferably between 2 h and 24 h;

2nd mixing stage: addition of the source of element Me, optionally dissolved in the minimum quantity of water;

2nd stirring period: duration between 0.3 h and 4 h and preferably between 0.5 h and 2 h;

3rd mixing stage: addition of a mixture containing the sources of TPA cations and of TMA cations, optionally an additional quantity of water and, in the case of the preparation of the MeAPSO compounds, the source of the element Si; and 3rd stirring period: duration between 4 h and 30 h and preferably between 6 h and 24 h.

The third stirring period may be advantageously followed by a period of treatment with ultrasound (sonication) for a few hours, for example from 4 to 8 hours, which treatment consists in immersing the receptacle containing the gel in an ultrasonics tank.

The most suitable source of the element P is concentrated phosphoric acid, but organic derivatives of phosphoric acid, such as phosphoric esters like trialkyl phosphates are also suitable.

The source of the element Al may be chosen from aluminium oxides, oxyhydroxides and hydroxides such as pseudoboehmite AlOOH or hydrargillite $Al(OH)_3$, but aluminium salts, especially chloride, nitrate or sulphate, or aluminium alkoxides such as aluminium isopropoxide $Al(O\text{-}isopropyl)_3$ are also suitable. A common source may also be used for the elements Al and P, such as an aluminophosphate.

The source of the metal Me, a metal which must be capable of adopting the tetrahedral coordination in an oxide, may be chosen from salts, for example chloride, nitrate, sulphate, acetate, hydroxides, oxides and alkoxides.

The source of the element silicon needed for the preparation of the MeAPSO-FAU compounds may be a silica such as a silica sol, pyrogenic silica, precipitated silica or a silicon alkoxide and, in general, any silicon compound capable of releasing this element in aqueous solution in a reactive form.

The addition of seeds to the gel before it is heated generally makes the crystallization easier. These seeds may be obtained by grinding crystals which have the FAU structure, and preferably crystals containing the elements Al, P, Me and optionally Si.

Heating of the gel (reaction mixture) is preferably carried out in an autoclave. The crystallization temperature is chosen more especially between 80° C. and 200° C. and preferably between 110° C. and 150° C. The time needed to obtain crystallization depends on the gel composition, the heating temperature and the presence or absence of seeds. The said time is generally between 12 hours and 5 days.

The crystallization period may be shortened by resorting to any one of the methods commonly employed such as seeding, as mentioned above, recycling of the mother liquors and the separation of the nucleation and growth stages. When the crystallization is complete the precursor solid obtained is isolated from the mother liquors by centrifuging or by filtration and is then washed with demineralized water and dried.

During the stage of calcination of the solid precursor in order to convert it into microporous solid in the calcined form, the solid is preferably heated in the presence of a gas preferably containing molecular oxygen in order to facilitate the destruction of the organic cations. The calcination temperature is higher than 400° C. and preferably between 450° C. and 550° C.

The MeAPO-FAU and MeAPSO-FAU microporous solids according to the invention can be employed, in the calcined state, as adsorbents for performing the selective adsorption of molecules less than 8 Å in size or else as catalysts or components of catalysts which can be employed in catalytic conversion reactions of organic compounds and especially of hydrocarbon compounds.

The invention is illustrated by the following examples, which are given without any limitation being implied.

EXAMPLE 1

Synthesis of a CoAPO-FAU compound 1.6 g of pseudoboehmite were dispersed in a solution containing 2.94 g of 85% phosphoric acid and 4.48 g of water. This mixture was stirred for a period $T_1$ of 6 hours with the aid of a bar magnet. A solution made up of 0.32 g of cobalt acetate of formula $Co(CH_3COO)_2 \cdot 4H_2O$ and 1.85 g of water was then added to the said mixture. The new mixture obtained was stirred for a period $T_2$ of 1.5 hours and was then completed by adding to it a solution consisting of 10.41 g of tetrapropylammonium hydroxide (TPAOH) at a concentration of 40% in water, 3.12 g of tetrapropylammoniumbromide (TPABr), 0.14 g of tetramethylammonium hydroxide (TMAOH) pentahydrate and 1.01 g of water. The reaction mixture thus formed, which had the consistency of a gel, was matured with stirring for a period $T_3$ of 14 hours, and then subjected to sonication (stoppered receptacle containing the gel, placed in an ultrasonics tank) for a period $T_4$ of 6 hours.

The molar composition of the gel (reaction mixture) thus prepared, expressed as oxide and referred to 1 mole of $P_2O_5$, was the following:

$P_2O_5$; $0.95Al_2O_3$; $0.1CoO$; $1.60TPAOH$; $0.92TPABr$; $0.06TMAOH$; $62.4H_2O$

After transfer into a 60-ml autoclave coated internally with polytetrafluoroethylene (PTFE), the gel was heated without stirring to 120° C. for a period $T_5$ of 78 hours to form a crystalline product. After cooling, the crystalline solid obtained was isolated and purified by centrifuging and washing with demineralized water. After drying at 60° C. 1.6 g of product were obtained.

The $d_{hkl}$ and I/Io values of the lines in the X-ray diffraction pattern of this product correspond to the values in the Table and enable this product to be identified as a CoAPO-FAU compound. The product contains the impurity CoAPO-AFR whose presence is revealed by weak lines in the diffraction pattern. After calcination in air at 500° C., for 4 hours, the product retains the structure of FAU type. Chemical analysis of the dehydrated calcined product, expressed according to the empirical formula $(Me_xAl_yP_z)O_2$, is the following:

$(Co_{0.08}Al_{0.42}P_{0.5})O_2$.

After dehydration at 150° C. the crude synthesis product contained a proportion of structuring agent (TPA cations+ TMA cations) in its pores and cavities, representing 0.11 mol per mole of $(Co_{0.08}Al_{0.42}P_{0.5})O_2$. The formula of the crude synthesis product, in its dehydrated form, is written: $(S)_{0.11}(Co_{0.08}Al_{0.42}P_{0.5})O_2$, where S=TPA+TMA in a TPA:TMA molar ratio=1.3.

EXAMPLE 2

Synthesis of a CoAPO-FAU compound with use of seeds

A gel was prepared by following the procedure described in Example 1 and by operating with the following quantities of reactants and times:

| Reactants | | Times |
|---|---|---|
| Pseudoboehmite | 1.62 g | |
| 85% $H_3PO_4$ | 2.98 g | |
| $H_2O$ | 4.28 g | |
| | | $T_1$ = 24 hours |
| Co $(CH_3COO)_2 \cdot 4H_2O$ | 0.26 g | |
| $H_2O$ | 1 g | |
| | | $T_2$ = 3 hours |
| 40% TPAOH | 9.19 g | |
| TPABr | 0.82 g | |
| TMAOH $\cdot$ $5H_2O$ | 0.37 g | |
| $H_2O$ | 1.22 g | |
| | | $T_3$ = 22 hours |
| | | $T_4$ = 5 hours |

After the sonication stage 40 g of seeds originating from the grinding of CoAPO-FAU crystals from a preceding synthesis were added to the reaction mixture.

The molar composition of the gel thus prepared, expressed as oxide and referred to 1 mole of $P_2O_5$, was the following:

$P_2O_5$; 0.95$Al_2O_3$; 0.08Co; 1.40TPAOH; 0.24TPABr; 0.16TMAOH; 60$H_2O$

After crystallization of the gel (in an autoclave lined internally with PTFE) by heating to 120° C. for a period $T_5$ of 53 hours, the crystalline solid was isolated by centrifuging and the said solid was then purified by washing with demineralized water.

After drying at 60° C. 1.75 g of a product were collected; its X-ray diffraction pattern, comparable with that in the table, enables it to be identified as a CoAPO-FAU phase. The product calcined at 500° C. is stable.

The chemical composition of the dehydrated calcined product, referred to the formula unit $(Me_xAl_yP_z)O_2$, is written $(Co_{0.06}Al_{0.44}P_{0.5})O_2$.

In the crude synthesis product (before calcining) the number of moles of structuring agent, referred to the above-mentioned formula unit, is 0.12.

The formula of the crude synthesis product in its dehydrated form is written $(S)_{0.12}(Co_{0.06}Al_{0.44}P_{0.5})O_2$ where S=TPA+TMA in a TPA:TMA molar ratio=1.2.

EXAMPLE 3

Synthesis of a ZnAPO-FAU compound

A gel was prepared by following the procedure described in Example 1, but replacing the 40% TPAOH solution with a 20% solution and employing zinc acetate instead of cobalt acetate.

The quantities of reactants and the times employed were the following:

| Reactants | | Times |
|---|---|---|
| Pseudoboehmite | 1.62 g | |
| 85% $H_3PO_4$ | 2.98 g | |
| $H_2O$ | 4.06 g | |
| | | $T_1$ = 24 hours |
| $Zn(CH_3COO)_2 \cdot 2H_2O$ | 0.30 g | |
| | | $T_2$ = 2 hours |
| 20% TPAOH | 20.69 g | |
| TPABr | 0.82 g | |
| TMAOH $\cdot$ $5H_2O$ | 0.14 g | |
| | | $T_3$ = 18 hours |
| | | $T_4$ = 6 hours |

After sonication 40 g of seeds originating from grinding of ZnAPO-FAU crystals produced in a preceding synthesis were added.

The molar composition of the gel thus prepared, referred to one mole of $P_2O_5$, was the following:

$P_2O_5$; 0.95$Al_2O_3$; 0.10ZnO; 1.58TPAOH; 0.24TPABr; 0.06TMAOH; 96.6$H_2O$.

After crystallization of the gel (in an autoclave lined internally with PTFE) by heating to 150° C. for 48 hours ($T_5$), the crystalline solid was isolated by centrifuging and the said solid was then purified by washing with demineralized water. After drying at 60° C. 1.5 g of a product were collected; its X-ray diffraction pattern, comparable with that in the table, enables it to be identified as a ZnAPO-FAU phase. The product calcined at 500° C. is stable.

The chemical composition of the dehydrated calcined product, referred to the formula unit $(Me_xAl_yP_z)O_2$, is written $(Zn_{0.08}Al_{0.42}P_{0.5})O_2$.

In the crude synthesis product (before calcining) the number of moles of structuring agent, referred to the above formula unit, is 0.12.

The formula of the crude synthesis product, in its dehydrated form, is written $(S)_{0.12}(Zn_{0.08}Al_{0.42}P_{0.5})O_2$ where S=TPA+TMA in a TPA:TMA molar ratio=1.2.

EXAMPLE 4

(Control)

A gel was prepared by following the procedure described in Example 1, the said gel having a composition approaching that of Example 2 but not containing any cobalt compound.

The quantities of reactants and the times employed were the following:

| Reactants | | Times |
|---|---|---|
| Pseudoboehmite | 0.86 g | |
| 85% $H_3PO_4$ | 1.49 g | |
| $H_2O$ | 2.28 g | |
| | | $T_1$ = 7 hours |
| 40% TPAOH | 4.7 g | |
| TPABr | 0.89 g | |
| 25% TMAOH | 0.21 g | |
| $H_2O$ | 2.6 g | |
| | | $T_3$ = 17 hours |

The molar composition of the gel thus prepared, referred to one mole of $P_2O_5$, was the following:

$P_2O_5$; 1$Al_2O_3$; 1.42TPAOH; 0.52TPABr; 0.09TMAOH; 75$H_2O$.

The crystallization of the gel ($T_5$=23 hours at 150° C.), the isolation, the washing and the drying of the resulting solid were performed according to the procedure described in Example 1.

A phase of the $AlPO_4$-AFR type was identified by radiocrystallographic analysis. It therefore appears that the absence of the metal Me, cobalt in this example, prevents the crystallization of the phase with the FAU structure.

EXAMPLE 5

Synthesis of a ZnAPSO-FAU compound

A gel was prepared by following the procedure described in Example 1, by additionally incorporating a source of the element silicon and by employing zinc acetate as source of zinc constituting the metal Me.

The quantities of reactants and the times employed were the following:

| Reactants | | Times |
|---|---|---|
| Pseudoboehmite | 0.8 g | |
| 85% H$_3$PO$_4$ | 1.47 g | |
| H$_2$O | 2.27 g | |
| | | T$_1$ = 6 hours |
| Zn(CH$_3$COO)$_2$ · 2H$_2$O | 0.15 g | |
| H$_2$O | 1.22 g | |
| | | T$_2$ = 2 hours |
| 40% TPAOH | 5.09 g | |
| TPABr | 0.9 g | |
| TMAOH · 5H$_2$O | 0.11 g | |
| SiO$_2$ (Cab-O-Sil ®) | 0.18 g | |
| H$_2$O | 1.47 g | |
| | | T$_3$ = 22 hours |

The molar composition of the gel thus prepared, referred to one mole of P$_2$O$_5$, was the following:

P$_2$O$_5$; 0.95Al$_2$O$_3$; 0.10ZnO; 0.47SiO$_2$; 1.57TPAOH; 0.53TPABr; 0.10TMAOH; 78H$_2$O

The crystallization of the gel (T$_5$=67 hours at 120° C.), the isolation, the washing and the drying of the resulting solid were performed according to the procedure described in Example 1.

A phase of the MeAPSO-FAU type with gel and pseudoboehmite are identified by radiocrystallographic analysis. The presence of silica makes the crystallization of the gel more difficult.

EXAMPLE 6
Synthesis of a ZnAPSO-FAU compound

A gel was prepared by following the procedure described in Example 1, with the quantities of reactants and the times employed in Example 5, except that the quantity of Cab-O-Sil® silica introduced was halved and that 20 mg of seeds originating from the grinding of crystals of ZnAPO-FAU were incorporated into the gel before its crystallization.

The molar composition of the gel thus prepared, referred to one mole of P$_2$O$_5$, was the following:

P$_2$O$_5$; 0.95Al$_2$O$_3$; 0.10ZnO; 0.23SiO$_2$; 1.57TPAOH; 0.53TPABr; 0.10TMAOH; 78H$_2$O.

The crystallization of the gel (T$_5$=52 hours at 120° C.), the isolation, the washing and the drying of the resulting solid were performed according to the procedure described in Example 1.

A phase of the MeAPSO-FAU type is identified by radiocrystallographic analysis. The product calcined at 500° C. is stable.

The chemical composition of the calcined product, in the dehydrated state, is the following:

(Zn$_{0.08}$Al$_{0.40}$P$_{0.42}$Si$_{0.1}$)O$_2$.

In the crude form from synthesis (before calcining) the number of moles of structuring agent, referred to the formula unit (Me$_x$Al$_u$P$_v$Si$_w$)O$_2$ is 0.14.

The formula of the crude synthesis product, in its dehydrated form, is written (S)$_{0.14}$(Zn$_{0.08}$Al$_{0.40}$P$_{0.42}$Si$_{0.1}$)O$_2$ where S=TPA+TMA in a TPA:TMA molar ratio=1.2.

EXAMPLE 7
Synthesis of a ZnAPSO-FAU compound of low Zn content

This example illustrates the possibility of preparing a compound of the MeAPSO-FAU type with very low contents of metal Me, in this case consisting of Zn.

The quantity of zinc acetate introduced was 0.03 g. Apart from this the procedure was similar to that described in Example 6.

The molar composition of the gel thus prepared, referred to 1 mole of P$_2$O$_5$, was the following:

P$_2$O$_5$; 0.95Al$_2$O$_3$; 0.02ZnO; 0.23SiO$_2$; 1.6TPAOH; 0.52TPABr; 0.1TMAOH; 80H$_2$O.

20 mg of ground ZnAPO-FAU crystals are added to the reaction mixture and after this the whole is heated to 120° C. for 50 hours (T$_5$). After sonication 0.8 g of solid are recovered and are identified, from its X-ray pattern, as a phase of the MeAPSO-FAU type.

The chemical composition of the calcined product, in the dehydrated state, is the following:

(Zn$_{0.02}$Al$_{0.45}$P$_{0.41}$Si$_{0.12}$)O$_2$.

In the crude form from synthesis (before calcining), the number of moles of structuring agent, referred to the formula unit (Me$_x$Al$_u$P$_v$Si$_w$)O$_2$, is 0.12.

The formula of the crude synthesis product, in its dehydrated form, is written (S)$_{0.12}$(Zn$_{0.02}$Al$_{0.45}$P$_{0.41}$Si$_{0.12}$)O$_2$ where S=TPA+TMA in a TPA:TMA molar ratio=1.3.

We claim:

1. Crystalline microporous solids consisting of aluminophosphates substituted in the framework by a divalent metal Me (MeAPO solids) or by a divalent metal Me and silicon (MeAPSO solids), which exhibit a molar composition of their framework which, expressed as oxide, is defined by the empirical formula (Me$_x$Al$_y$P$_z$)O$_2$ in the case of the MeAPO solids and (Me$_x$Al$_u$P$_v$Si$_w$)O$_2$ in the case of the MeAPSO solids, with the symbols x, y, z, u, v and w denoting the molar contents of the elements associated with these symbols in the corresponding formula of the oxide with x+y+z=1 and x+u+v+w=1, the said solids having a crystal structure corresponding substantially to that of faujasite and in the said framework formulae (Me$_x$Al$_y$P$_z$)O$_2$ and (Me$_x$Al$_u$P$_v$Si$_w$)O$_2$ the symbols x, y, z, u, v and w are such that 0.001≦x≦0.15, 0.34≦y≦0.51, 0.49≦z≦0.51, 0.30≦u≦0.51, 0.30≦v≦0.51 and 0.001≦w≦0.20.

2. The crystalline microporous solids according to claim 1, wherein the divalent metal Me denotes at least one metal selected from the group consisting of metals capable of adopting the tetrahedral coordination in an oxide.

3. The crystalline microporous solids according to claim 1 wherein they are in the calcined state.

4. The crystalline microporous solids according to claim 1 wherein they are crude synthesis products and have, in the dehydrated state, the formula (S)$_s$:(Me$_x$Al$_y$P$_z$)O$_2$ or (Me$_x$Al$_u$P$_v$Si$_w$)O$_2$, where S is an organic structuring agent and s is a number between 0.06 and 0.2 representing the molar quantity of the structuring agent S per mole of the oxide (Me$_x$Al$_y$P$_z$)O$_2$ or (Me$_x$Al$_u$P$_v$Si$_w$)O$_2$.

5. The crystalline microporous solids according to claim 4, wherein the structuring agent S is a mixture of tetrapropylammonium cations and tetramethylammonium cations.

6. The crystalline microporous solids according to claim 2 wherein the divalent metal is selected from the group consisting of Zn, Cu, Co, Ni, Mg and Mn.

7. The crystalline microporous solids according to claim 4 wherein s is a number between 0.08 and 0.15.

8. The crystalline microporous solids according to claim 1 having x-ray diffraction patterns which correspond substantially to the pattern shown in the following table:

TABLE

Mean values of $d_{hkl}$ and relative intensities measured on an x-ray diffraction pattern obtained with the precursors of the microporous solids MeAPO-FAU and MeAPSO-FAU.

| 2θ (degrees) | $d_{hkl}$ (Å) | I/Io |
|---|---|---|
| 6.17 | 14.3 ± 0.2 | vs |
| 10.10 | 8.75 | m |
| 11.86 | 7.45 ± 0.05 | w |
| 15.61 | 5.67 | S |
| 18.63 | 4.76 | mS |
| 20.30 | 4.37 | m |
| 21.21 | 4.18 | w |
| 22.72 | 3.91 | mw |
| 23.57 | 3.77 | S |
| 24.90 | 3.57 | vw |
| 25.70 | 3.464 | mw |
| 26.96 | 3.305 | mS |
| 27.68 | 3.220 ± 0.008 | vw |
| 29.53 | 3.023 | mw |
| 30.63 | 2.917 | mw |
| 31.28 | 2.857 | m |
| 32.33 | 2.767 | w |
| 32.94 | 2.717 | vw |
| 33.95 | 2.638 | mw |
| 34.55 | 2.594 | w |

9. Process for the synthesis of a precursor of the crystalline microporous solids according to claim 1 which comprises preparing a reaction mixture comprising gel and containing water, a source of the element P, a source of the element Al, a source of the divalent element Me in the case of the MeAPO compounds with additionally a source of the element silicon in the case of the MeAPSO compounds, organic structuring agents, a pH regulator for the gel, the quantities of the said reactants being adjusted so as to give the gel a composition permitting its crystallization as MeAPO or MeAPSO, and then maintaining the gel obtained at a temperature below 200° C. and at a pressure at least equal to the autogenous pressure of the mixture consisting of the said gel, for a period sufficient to produce the crystallization of the gel into a precursor of the microporous solid, consisting of the microporous solid entrapping the structuring agent in its cavities, and wherein the structuring agent consisting of a mixture of tetrapropylammonium (TPA) cations and of tetramethylammonium (TMA) cations in a TPA:TMA molar ratio of between 3 and 50.

10. Process according to claim 9, wherein the molar ratio of the TPA cations to the TMA cations in the mixture forming the structuring agent ranges from 8 to 40.

11. Process according to claim 9, wherein the pH of the reaction mixture is adjusted to a value of between 6 and 8.5.

12. Process according to claim 11, wherein the pH regulating agent is an organic base.

13. Process according to claim 9 wherein the molar composition, referred to $P_2O_5$, and the molar ratios of the reactants in the gel have values included in the ranges hereinafter:

| | Range |
|---|---|
| $P_2O_5$ | 1 |
| $Al_2O_3$ | 0.7–1.3 |
| MeO | 0.01–0.3 |
| $SiO_2$ (for MeAPSO-FAU) | 0.01–0.6 |

| | Range |
|---|---|
| TPAOH | 1.2–2.0 |
| TPAOH + TPAX (ΣTPA) | 1.4–2.7 |
| TMAOH | 0–0.3 |
| TMAOH + TMAX (ΣTMA) | 0.03–0.3 |
| ΣTPA:ΣTMA | 3–50 |
| $H_2O$ | 50–120 |

14. Process according to claim 13, wherein the preparation of the gel comprises the following successive stages:
   a first mixing stage consisting in mixing the source of the element P with the source of the element Al and water so that the weight ratio of water to the quantity of the two sources (P and Al) is between 0.7 and 1.3;
   a first period of stirring of the resulting mixture, the duration of which lies between 1 h and 30 h;
   a second mixing stage during which the source of divalent element Me is incorporated, optionally dissolved in the minimum quantity of water;
   a second stirring stage, the duration of which lies between 0.3 h and 4 h;
   a third mixing stage during which the sources of TPA cations and of TMA cations, optionally an additional quantity of water and, for the preparation of the MeAPSO compounds, the source of the element Si are incorporated into the reaction mixture; and
   a third stirring period whose duration lies between 4 h to 30 h.

15. Process according to claim 14, wherein after the third stirring period the reaction mixture is subjected to a period of treatment with ultra-sound.

16. Process according to claim 9, wherein the source of the element P consists of phosphoric acid or of a phosphoric ester.

17. Process according to claim 9, wherein the source of the element Al is selected from the group consisting of aluminium oxides, oxyhydroxides and hydroxides, aluminium salts and aluminium alkoxides.

18. Process according to claim 16, wherein the elements P and Al, are both obtained from an aluminophosphate.

19. Process according to claim 9, wherein the source of the divalent metal Me is selected from the group consisting of salts, hydroxides, oxides and alkoxides of the said metal.

20. Process according to claim 9, wherein the source of silicon which is employed for the preparation of the MeAPSO compounds is a silica.

21. Process according to claim 9, wherein seeds are added to the gel before the crystallization stage.

22. Process according to claim 9, wherein the crystallization temperature is chosen between 80° C. and 200° C.

23. Process according to claim 9, wherein the crystallization period is between 12 hours and 5 days.

24. Process according to claim 9, wherein the precursor of the microporous solids is subjected to a calcination at a temperature higher than 400° C.

25. Process according to claim 24, wherein the calcination is performed in the presence of molecular oxygen.

26. The process according to claim 9 wherein the precursor is subjected to calcination to destroy the structuring agent and to produce the calcined form of the microporous solids.

27. Process according to claim 11 wherein the pH is adjusted to a value of between 6.5 and 8.

28. Process according to claim 12 wherein the organic base is at least one member selected from the group consisting of tetrapropylammonium hydroxide (TPAOH) and tetramethylammonium hydroxide (TMAOCH).

29. Process according to claim 9, wherein the source of TPA cations is at least one member selected from the group consisting of tetrapropylammonium hydroxide and tetrapropylammonium halide (TPAX).

30. Process according to claim 9, wherein the source of TMA cations is at least one member selected from the group consisting of tetramethylammonium hydroxide (TMAOH) and a tetramethylammonium halide (TMAX).

31. Process according to claim 14 wherein the stirring duration in the first period lies between 2 h and 24 h; the stirring duration in the second stirring stage lies between 0.5 h and 2 h; and the stirring duration in the third stirring period is between 6 h and 24 h.

32. Process according to claim 20 wherein the silica is selected from the group consisting of a silica sol, pyrogenic silica, precipitated silica and a silicon alkoxide.

33. Process according to claim 22, wherein the crystallization temperature is between 110° C. and 150° C.

34. Process according to claim 24, wherein calcination is performed at a temperature between 450° C. and 550° C., and in the presence of gas.

35. Process according to claim 7 wherein the molar composition, referred to as $P_2O_5$, and the molar ratios of the reactants in the gel have values included in the ranges hereinafter:

|  | Range |
|---|---|
| $P_2O_5$ | 1 |
| $Al_2O_3$ | 0.8–1.1 |
| MeO | 0.02–0.15 |
| $SiO_2$ (for MeAPSO-FAU) | 0.05–0.4 |
| TPAOH | 1.3–1.6 |
| TPAOH + TPAX (ΣTPA) | 1.6–2.5 |
| TMAOH | 0–0.2 |
| TMAOH + TMAX (ΣTMA) | 0.05–0.2 |
| ΣTPA:ΣTMA | 8–40 |
| $H_2O$ | 55–100 |

36. Process for the selective adsorption of molecules smaller than 8 Å in size from a medium containing said molecules which comprises contacting said medium with the crystalline microporous solids of claim 3 so as to selectively adsorb said molecules.

37. Process for the catalytic conversion of hydrocarbon compounds which comprises conducting the conversion in the presence of the crystalline microporous solids of claim 3.

* * * * *